US010178925B2

United States Patent
Rithener et al.

(10) Patent No.: US 10,178,925 B2
(45) Date of Patent: Jan. 15, 2019

(54) MODULAR BEVERAGE DISPENSING SYSTEM

(75) Inventors: Blaise Rithener, La Tour-de-Peilz (CH); Antoine Cahen, Lausanne (CH)

(73) Assignee: Nestec S.A., Vevey (CH)

( * ) Notice: Subject to any disclaimer, the term of this patent is extended or adjusted under 35 U.S.C. 154(b) by 846 days.

(21) Appl. No.: 13/978,652

(22) PCT Filed: Jan. 5, 2012

(86) PCT No.: PCT/EP2012/050144
§ 371 (c)(1),
(2), (4) Date: Jul. 8, 2013

(87) PCT Pub. No.: WO2012/093157
PCT Pub. Date: Jul. 12, 2012

(65) Prior Publication Data
US 2013/0276636 A1     Oct. 24, 2013

(30) Foreign Application Priority Data
Jan. 7, 2011   (EP) .................................... 11150389

(51) Int. Cl.
*A47J 31/44* (2006.01)
*A47J 31/40* (2006.01)
*A47J 31/60* (2006.01)

(52) U.S. Cl.
CPC ....... *A47J 31/4403* (2013.01); *A47J 31/4485* (2013.01); *A47J 31/60* (2013.01); *A47J 2201/00* (2013.01)

(58) Field of Classification Search
CPC .... A47J 31/4485; A47J 31/4403; A47J 31/60; A47J 31/4421; A47J 31/3619;
(Continued)

(56) References Cited

U.S. PATENT DOCUMENTS

| 4,757,753 | A | * | 7/1988 | Pandolfi | .................. | A47J 31/36 |
| | | | | | | 99/290 |
| 4,829,888 | A | * | 5/1989 | Webster | .............. | A47J 31/4403 |
| | | | | | | 99/284 |

(Continued)

FOREIGN PATENT DOCUMENTS

| EP | 2070454 | 6/2009 |
| EP | 2080459 | 7/2009 |

(Continued)

*Primary Examiner* — Dana Ross
*Assistant Examiner* — Lawrence Samuels
(74) *Attorney, Agent, or Firm* — K&L Gates LLP

(57) ABSTRACT

A beverage preparation system (1,2,3) comprises: —a first machine (1) for preparing a first beverage (15'''), the first machine having a first outlet (11) for dispensing a beverage, such as coffee, onto a beverage dispensing area (12) for positioning a cup or mug (4); and—a second machine (2) for preparing and dispensing a second beverage (25''') via a second beverage outlet (21), the second machine being disconnectably connected to the first machine and separable therefrom. The first and second machines (1,2), when connected, are configurable so that the second outlet (21) is positioned or positionable adjacent to the first outlet (11) to dispense the second beverage (25''') onto the beverage dispensing area (12) and into a cup or mug (4) in position for collecting the first beverage (15''') from the first beverage outlet.

17 Claims, 2 Drawing Sheets

(58) Field of Classification Search
CPC ...... A47J 31/3638; A47J 31/02; A47J 31/007;
A47J 31/005; A47J 31/52; A47J 31/043;
A47J 31/303; A47J 31/3614; A47J
2201/00; A23G 9/045; B65D 85/8043;
B67D 1/0057
USPC ......... 99/285, 291, 279, 275, 280, 284, 290,
99/292, 293, 295, 303, 323.1, 28, 9 R,
99/323.2
See application file for complete search history.

(56) References Cited

U.S. PATENT DOCUMENTS

| | | | | |
|---|---|---|---|---|
| 4,892,031 A * | 1/1990 | Webster | ............... | A47J 31/057 99/284 |
| 5,265,520 A * | 11/1993 | Giuliano | ............... | A47J 31/401 141/100 |
| 5,473,972 A * | 12/1995 | Rizzuto | ............... | A47J 31/4485 99/290 |
| 5,498,757 A * | 3/1996 | Johnson | ............... | A23C 9/1524 261/152 |
| 5,549,036 A * | 8/1996 | Hourizadeh | ........ | A47J 31/4485 99/286 |
| 5,611,262 A * | 3/1997 | Rizzuto | ............... | A47J 31/4485 99/290 |
| 5,628,239 A * | 5/1997 | Wu | ............... | A47J 31/4485 99/290 |
| 5,916,351 A * | 6/1999 | Sintchak | ............ | A47J 31/4403 99/279 |
| 6,029,562 A * | 2/2000 | Sintchak | ............ | A47J 31/4403 220/4.02 |
| 6,293,187 B1 * | 9/2001 | Zils | ..................... | A47J 31/4482 99/293 |
| 8,403,306 B2 * | 3/2013 | Stahl | .................. | A47J 31/4489 261/77 |
| 8,770,094 B2 * | 7/2014 | Rithener | ............... | A47J 31/402 141/100 |
| 9,138,095 B2 * | 9/2015 | Peretti | ................. | A47J 31/4485 |
| 9,265,379 B2 * | 2/2016 | Tonelli | ................. | A47J 31/4485 |
| 2005/0258186 A1 * | 11/2005 | Hart | ..................... | A47J 31/007 222/1 |
| 2007/0031558 A1 * | 2/2007 | Lussi | ................... | A47J 31/402 426/520 |
| 2007/0062378 A1 * | 3/2007 | Glucksman | ......... | A47J 31/3609 99/279 |
| 2007/0243305 A1 * | 10/2007 | Marconi | .............. | A47J 31/4485 426/596 |
| 2009/0101021 A1 * | 4/2009 | Tonelli | ................ | A47J 31/4485 99/290 |
| 2009/0173235 A1 * | 7/2009 | Kollep | ................ | A47J 31/4482 99/279 |
| 2010/0047406 A1 * | 2/2010 | Reyhanloo | .......... | A47J 31/4485 426/231 |
| 2010/0162898 A1 * | 7/2010 | Mahlich | .................. | A47J 31/36 99/290 |
| 2010/0212508 A1 * | 8/2010 | Buttiker | .............. | A47J 31/4485 99/290 |
| 2010/0237517 A1 * | 9/2010 | Stahl | ................... | A47J 31/4489 261/77 |
| 2010/0251900 A1 * | 10/2010 | Cahen | ..................... | A47J 31/44 99/295 |
| 2010/0263543 A1 * | 10/2010 | Krauchi | .............. | A47J 31/4403 99/280 |
| 2010/0263547 A1 * | 10/2010 | Cahen | ................ | A47J 31/4403 99/300 |
| 2011/0174162 A1 * | 7/2011 | Ullmann | ............. | A47J 31/4485 99/323.3 |
| 2012/0118164 A1 * | 5/2012 | Tonelli | ................ | A47J 31/4485 99/280 |
| 2012/0125202 A1 * | 5/2012 | Remo | ..................... | A47J 31/60 99/286 |
| 2012/0297989 A1 * | 11/2012 | Tonelli | ............... | A47J 31/4485 99/293 |
| 2013/0276636 A1 * | 10/2013 | Rithener | ............. | A47J 31/4485 99/285 |
| 2016/0000258 A1 * | 1/2016 | De'Longhi | ......... | A47J 31/4485 99/323.1 |

FOREIGN PATENT DOCUMENTS

| | | | |
|---|---|---|---|
| JP | 2008194074 | 8/2008 | |
| JP | 2008531162 | 8/2008 | |
| WO | WO 2006050900 A1 * | 5/2006 | ............ A47J 27/004 |
| WO | WO 2010044116 A2 * | 4/2010 | ......... A47J 31/4485 |
| WO | 2011015963 | 2/2011 | |

* cited by examiner

MODULAR BEVERAGE DISPENSING SYSTEM

CROSS REFERENCE TO RELATED APPLICATIONS

The present application is a National Stage of International Application No. PCT/EP2012/050144, filed on Jan. 5, 2012, which claims priority to European Patent Application No. 11150389.2, filed Jan. 7, 2011, the entire contents of which are being incorporated herein by reference.

FIELD OF THE INVENTION

The field of the invention pertains to beverage dispensing systems having a first beverage preparation machine and a second beverage preparation machine, in particular at least one of the machines is configured for preparing a beverage from an ingredient capsule.

For the purpose of the present description, a "beverage" is meant to include any human-consumable liquid substance, such as tea, hot or cold coffee, hot or cold chocolate, hot or cold milk, soup, baby food, hot or cold water, etc. . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee machines possess within a housing: filling means that include a pump for liquid, usually water, which pumps the liquid from a source of water that is cold or indeed heated through heating means, such as a heating resistor, a thermoblock or the like.

EP 1 864 598 discloses a coffee machine that is autonomous and that can be mounted onto a docking station. The beverage machine is arranged to be operable whether connected to the docking station or disconnected therefrom.

EP 1 878 368 discloses a beverage machine having a functional block in a housing that is rotatably mounted on a support base. The support base has a power connector for the beverage machine that allows such rotation. The functional block can be designed to be removable from the support base. The support base may have an extension with a power connector for mounting a milk-frothing apparatus thereon.

FR 2 544 185 discloses an old espresso machine in which a hot water, a steam preparation module and a plurality of different coffee preparation modules may be mechanically and electrically connected side-by-side. The aim is to provide a system with a sufficient number of parallel coffee outlets, as required for the normal use in a bar so as to permit preparation of several espressos simultaneously. More recently, a coffee machine having two preparation modules and two coffee dispensing areas has been disclosed in WO 2009/074550.

Likewise, U.S. Pat. No. 6,029,622 discloses a coffee dispensing system having three units made up of two coffee dispensing towers and a warming base mounted side-by-side to one another. The first dispensing tower is adapted for large airpot vessels. The second dispensing tower is adapted for cups. The warming base adjacent to the dispenser towers is configured for maintaining coffee in an airpot vessel or in a cup warm. The dispensing system is powered via a power cord connected to the mains. The dispensing unit and warming base have an internal power interconnection or can be interconnected externally via power cords. Each tower or warming base has its own power switch. The second dispensing tower may be substituted by a coffee grinder or another accessory or attachment.

There are also coffee machines that have an integrated milk frother for the preparation of milk-containing coffee, e.g. cappuccino. For instance, the milk-frother is arranged to intake fresh milk from a milk container and mix the milk with air and steam within a venturi device to dispense via an outlet froth into a user-mug. Examples of such devices are disclosed in EP 0 791 321, EP 1 830 683 and in EP 1 764 014.

WO 2009/074555 discloses a system including a coffee preparation machine that has a platform for receiving a removable milk-frothing jug. The milk-frothing device is powered via a disconnectable strix-type connection from the platform and can be removed therefrom for pouring frothed milk into a recipient.

Despite all the above developments, there is still a need to increase the versatility of beverage machines.

SUMMARY OF THE INVENTION

The invention thus relates to a beverage preparation system having a plurality of beverage preparation machines. For instance, such a machine is a coffee, tea, chocolate, cacao, milk or soup preparation machine.

In particular, the system comprises a first beverage machine for preparing a first beverage, the first machine having a first outlet for dispensing a beverage onto a beverage dispensing area for positioning a cup or mug.

In particular, the first machine is arranged for preparing within a beverage processing module a beverage by passing hot or cold water or another liquid through a capsule containing an ingredient, such as a flavouring ingredient, of the beverage to be prepared, such as ground coffee or tea or chocolate or cacao or milk powder. Such a beverage preparation module is for example disclosed in WO 2009/074550.

The beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml, e.g. the volume for filling a cup or mug, depending on the type of beverage. Formed and dispensed beverages may be selected from ristrettos, espressos, lungos, cappuccinos, café latte, americano coffees, teas, etc. . . . In particular, a coffee machine may be configured for dispensing espressos, e.g. an adjustable volume of 20 to 60 ml per serving, and/or for dispensing lungos, e.g. a volume in the range of 70 to 150 ml per serving.

The system comprises a second machine for preparing and dispensing a second beverage via a second beverage outlet. Typically, the second beverage prepared and dispensed by the second machine is mixable with the first beverage to modify the taste thereof. For instance, frothed or non-frothed, heated or non-heated milk may be dispensed as a second beverage to be mixed with a first beverage selected from coffee, chocolate or tea. Other beverage combinations are contemplated, e.g. involving syrup or sweeteners. Milk heating and/or frothing arrangements are known in the art, e.g. using a venturi system and/or a whisk, as for example disclosed in the abovementioned EP 0 791 321, EP 1 830 683, in EP 1 764 014 and WO 2009/074555.

The second machine is disconnectably connected to the first machine and separable therefrom. The connection may be mechanical, e.g. via a removable connector member such as an removably pluggable connector plate. The connection may be mechanical, to relatively position and secure the first and second machines. The connection may be to transmit power and/or data between the first and second machines. For instance, the first and second machines are connected via a wired, e.g. cable, or wireless, e.g. radio or light, data-transmission in particular of the known type, e.g. USB or XH or JST connection cable and like connections.

The connection is designed to be disconnectable by a user normally operating the machine, i.e. without having to dismantle the machines or significant parts thereof requiring intervention of a service person or other specially qualified person. Typically, the connection is removably plugged, clipped, locked or the like preferably in a simple and reliable manner for normal use of the machines. The connection may be direct from one machine to the other, e.g. one machine housing or frame to the other machine housing or frame mechanically and/or logically, or via an active or passive interface device, e.g. via a separate intermediate cable or mechanical connector.

The machines may be separated for transportation or when only one of the machines is needed. In a particular environment, only the first beverage may be desired so that the second machine dispensing a second beverage becomes superfluous and may be removed or simply not connected to the first machine. Thus, the first and/or the second machine(s) may be operated in a standalone configuration, i.e. without its companion machine, namely the first or second machine as the case may be.

In accordance with the invention, the first and second machines, when connected, are configurable so that the second outlet is positioned or positionable adjacent to the first outlet to dispense the second beverage onto the said beverage dispensing area and into a cup or mug in position for collecting the first beverage from the first beverage outlet.

In other words, when the first and second machines are connected, the first and second outlets are positionable sufficiently close to dispense first and second beverages into a cup or mug without having to move the cup or mug from under one outlet to the other outlet during the dispensing of the first and second beverages. Typically, the first and second beverage outlets are relatively positionable to be distant by no more than 5 cm, in particular less than 3 cm, such as less than 2 cm optionally less than 1 cm.

Dispensing area configurations for placing a user-cup under a beverage outlet are for example disclosed in EP 1 867 260 and EP 2 227 122.

As mentioned above, the second machine may be configured to dispense a milk-containing beverage. The second machine may have a milk supply arrangement, in particular a milk reservoir, such as a cooling cavity containing a milk tank. The second machine can include an arrangement for frothing and/or heating milk from said milk supply arrangement. The frothing and/or heating arrangement may comprise a steam generator for mixing the milk with steam and optionally air, in particular within a venturi device. The second machine may have a collector reservoir for collecting a cleaning liquid circulated through the frothing and/or heating arrangement, the cleaning liquid being in particular generated by a steam generator and then typically circulated along a milk path for cleaning thereof.

The second outlet can be movable between an operative position for dispensing the second beverage onto the beverage dispensing area, e.g. into a user-cup, and a distant position, such as a rest or service position. The second machine is in particular prevented from dispensing the second beverage when the second outlet is in the distant position, namely away from the dispensing area where the user-cup is supposed to be placed.

The second outlet can be movable only manually into the operative position. Such a configuration is desirable when there is a risk of collision between the second outlet and a cup that is improperly positioned on the dispensing area or of inappropriate dimensions so that it would interfere with the moving beverage outlet. By avoiding automatic movement of the beverage outlet into the operative position, there is no risk of unwanted collision between the outlet and the cup.

Conversely, the return of the outlet may be automatic if proper positioning and appropriate dimensions of the cup in the beverage dispensing area is ascertained. Hence, the second machine may comprise an actuator for automatically returning the second outlet from the operative position into the distant position, in particular at an end of a beverage dispensing process of the second machine, e.g. a serving of the second beverage. For example, the actuator comprises a spring that is stressed by manually moving the second outlet into the operative position and that drives the second outlet from the operative position into said distant position by relaxing. The spring may be of any kind appropriate to a particular configuration of the second machine, e.g. a traction, compression or flexion spring, a helicoidal, spiral or blade spring.

Typically, the first machine has a first control module for controlling the preparation of the first beverage. The second machine may have a second control module for controlling the preparation of the second beverage. These first and second control modules can be in direct or indirect data-communication when the second machine is connected to the first machine. Wired or wireless data-communication may be provided, for instance via a data-communication cable and/or via a USB or XH data-interface or similar means, e.g. RS232, etc. . . .

In a particular embodiment, the first and second control modules are in data-communication to coordinate dispensing of said first and second beverages via the first and second outlets. The first and second control modules may be arranged to coordinate and dispense, in particular successively, these first and second beverages on a single user-request of a combined beverage of the first and second beverages, in particular via a single user-actuation of an user-interface of the first or the second control module. For instance, the first machine or the second machine has a user-selector, e.g. a button, for requesting a beverage combining the first and second beverages. Thus, a combined beverage prepared by the first and second machines may be requested by a single user-touch of the appropriate user-interface.

Likewise, the first and second control modules may be arranged to provide information to a user via a user-interface that is integrated either in the first machine or in the second machine.

Such first and second machines can be disconnected, the first machine being arranged to prepare and dispense the first beverage and/or the second machine being arranged to prepare the second beverage. Hence, the first and/or second machines may be configured to operate both within the system, i.e. connected to the companion machine of the system, and in a standalone configuration, i.e. disconnected from the companion machine of the system, for instance when only the first or the second beverage is desired and/or requestable.

The first and the second machines may have each a power connection for separate connection to a power supply, e.g. to the mains. Thus separate powering of the machines is possible which allows a standalone operation of each of the first and second machines.

The invention also relates to a second machine for preparing a second beverage. The second machine has: a second control module and a second outlet for dispensing a second beverage onto a beverage dispensing area for positioning a user-recipient; and a connector disconnectably connectable to a first machine for preparing and delivering a first beverage, the first machine having a first control module.

The second control module is arranged to be in data-communication with said first module to coordinate and dispense, in particular successively, said first and second beverages on a single user-request of a combined beverage of said first and second beverages, in particular via a single user-actuation of an user-interface of the first or the second control module.

The second machine may further include any of the abovementioned feature relating to the above second machine and/or a combination of such features.

BRIEF DESCRIPTION OF THE DRAWINGS

The invention will now be described with reference to the schematic drawings, wherein.

DETAILED DESCRIPTION

Figure 1:
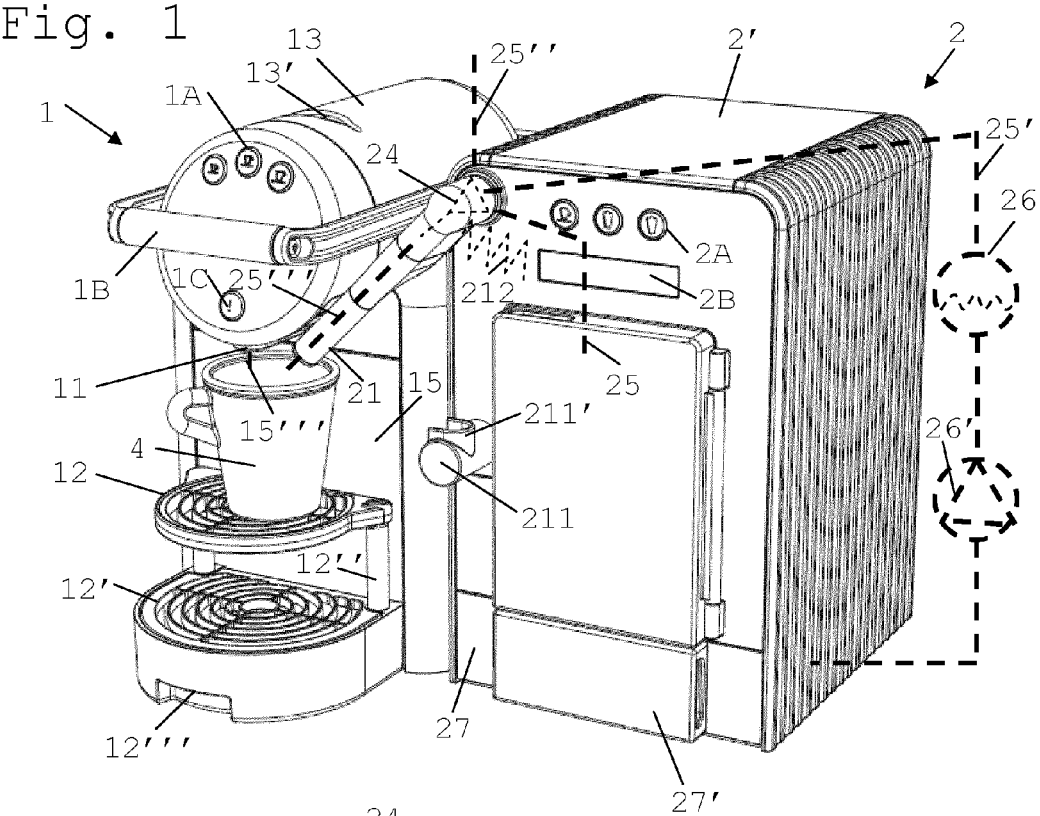
FIG. 1 illustrates a system according to the invention having a first beverage machine and a second beverage machine.

FIG. 1 shows a system 1,2 according to the invention. This system includes:
- a first machine 1 for preparing and dispensing a first beverage 15''' via a first outlet 11 onto a beverage dispensing area 12 for positioning a cup or mug 4; and
- a second machine 2 for preparing and dispensing a second beverage 25''' via a second beverage outlet 21, the second machine being disconnectably connected to the first machine and separable therefrom.

Figure 3:
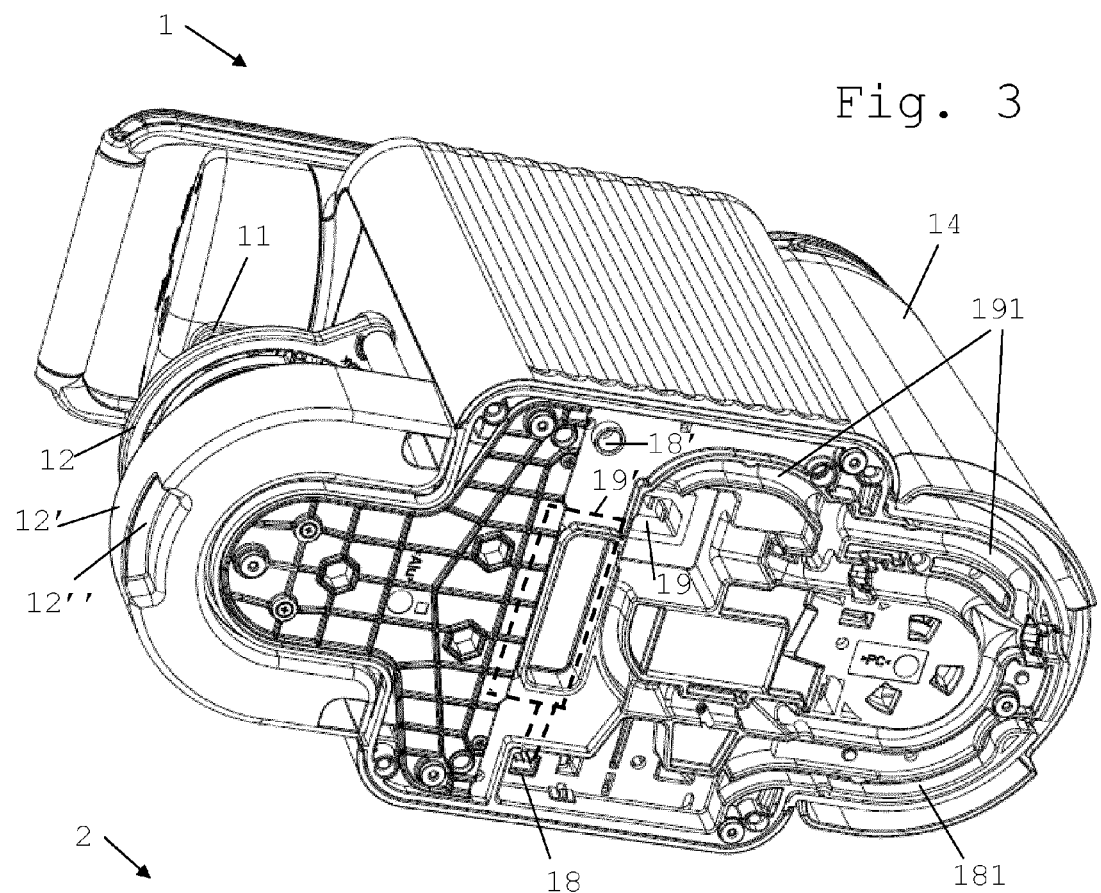
FIG. 3 is a perspective view from below of the first beverage machine shown in FIG. 1.

As illustrated in FIGS. 1 and 3, first machine 1 typically includes one or more of the following components:
a) a module 13, e.g. a brewing unit, delimiting in a processing position an inner flavouring chamber for receiving an ingredient of beverage 15''' such as a flavouring ingredient, in particular a pre-portioned ingredient supplied within a capsule, and for guiding via an inlet an incoming flow of liquid for flavouring thereof, such as water, through this ingredient to beverage outlet 11;

b) a handle 1B for bringing module 13 from this processing position into a transfer position and/or vice versa, the transfer position allowing insertion, e.g. from outside machine 1 via a capsule insertion slot 13', of such ingredient into module 13 and/or removal therefrom of said ingredient;

c) a user-interface 1A for allowing a user to request a beverage preparation, e.g. two or three different beverage preparations such as espresso or regular or lungo coffee, and/or a hot water switch 1C for dispensing hot water, and/or a master switch (main power switch) for switching machine 1 on and/or off;

d) an in-line heater, such as a thermoblock, for heating this flow of liquid to be supplied to the flavouring chamber of module 13;

e) a pump for pumping liquid through the in-line heater;

f) one or more fluid connecting members for guiding liquid from a source of liquid, such as tank 14 of liquid, to module 13;

g) an electric control unit 19' (in dotted lines in FIG. 3), in particular comprising a printed circuit board (PCB), for receiving instructions from a user via input user-interface 1A and for controlling the in-line heater and the pump;

h) one or more sensors for sensing at least one characteristic selected from characteristics of module 13, the in-line heater, the pump, liquid tank 14, an ingredient receptacle 15, a flow of the liquid (e.g. by a flowmeter), a pressure of the liquid and a temperature of the liquid, and for communicating such characteristic(s) to control unit 19'; and/or i) one or more user-recipient supports 12,12' delimiting a beverage dispensing area for positioning a cup or mug 4 under outlet 11.

The heater may be a thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation modules are for instance disclosed in WO 2009/074550 and WO 2009/130099, which are hereby incorporated by way of reference.

A pair of user-recipient supports 12,12' can be provided for supporting user-recipients of different heights under beverage outlet 11. Upper support 12 is in particular movable, e.g. pivotable about axis 12", away from under outlet 11 to allow positioning of a larger recipient on support 12' under outlet 11. At least one user-recipient support 12,12' may be provided with an arrangement 12''', e.g. a handle, opening or the like, to permit or facilitate manual seizure of the support 12,12' and removal thereof from machine 1. For instance, support 12,12' is/are mechanically connected to ingredient receptacle 15 and removable from machine 1 and insertable thereinto en bloc.

Further details of the flow circuit and structure and operation of such a machine 1 are for example disclosed in PCT/EP10/064772, PCT/EP10/064773, PCT/EP10/068580, EP 2010 152 556, EP 2010 163 649, EP 2010 169 201, EP 2010 169 766 and EP 2010 175 544, the contents of which are hereby incorporated by way of reference.

Second machine 2 may be arranged to dispense a milk-containing beverage 25''', such as heated and/or frothed milk, via second beverage outlet 21. Details of second machine 2 are for example disclosed in EP 2010 152 557 and EP 2010 152 558, the contents of which are hereby incorporated by way of reference.

In accordance with the invention, first and second machines 1,2, when connected together, are configurable so that second outlet 21 is positioned or positionable adjacent to the first outlet 11 to dispense second beverage 25''' onto beverage dispensing area 12 and into a cup or mug 4 when positioned for collecting first beverage 15''' from first beverage outlet 11.

Hence, first and second machines 1,2 are configured so that their outlets 11,21 can be positioned to dispense first and second beverages 15''',25''' into a cup or mug 4 without having to move the cup or mug under and between first and second outlets 11,21 for collecting first and second beverages 15''',25'''. First and/or second outlets 11,21 is/are typically tubular and generally straight and/or elongated.

Figure 4:
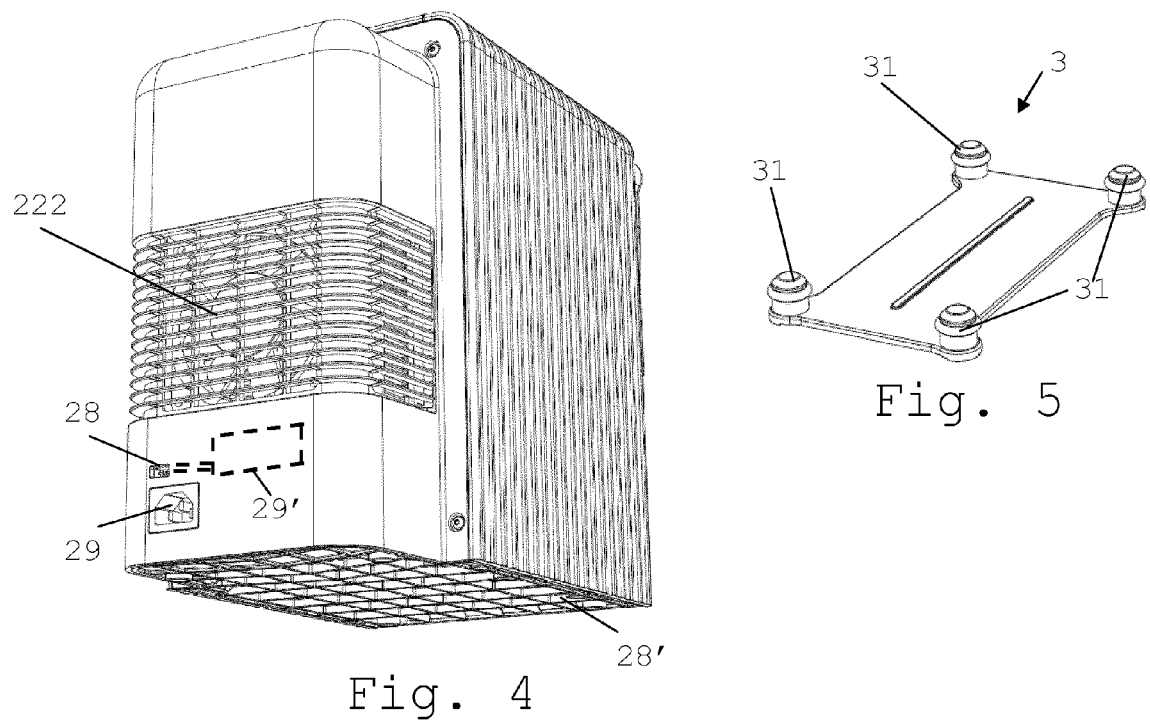
FIG. 4 is a perspective view from behind of the second beverage machine shown in FIGS. 1 and 2.
Figure 5:
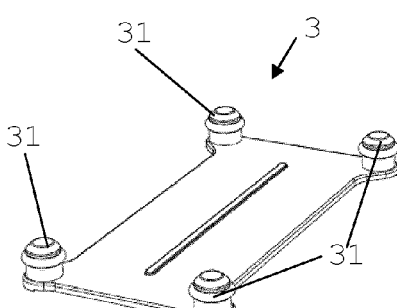
FIG. 5 shows a mechanical connector for mechanically connecting the first and second machines.

As shown in FIGS. 3 to 5, machines 1 and 2 may be connected together: mechanically, e.g. via a mechanical connecting member 3 that has plugs 31 fitting corresponding sockets 18',28' in machines 1,2, in particular in bottom faces of machines 1,2; and/or logically, e.g. via wired or wireless data-interfaces 18,28. A data-connection between machines 1,2 may be achieved with any communication standard, e.g. USB, XH, RS232 connections or the like. In a variation, the beverage machines may be mechanically connected together directly, i.e. the structures of the machines are mechanically joined, e.g. with a reversible clip mechanism, without any separate intermediate element such as connecting member 3.

Figure 2:
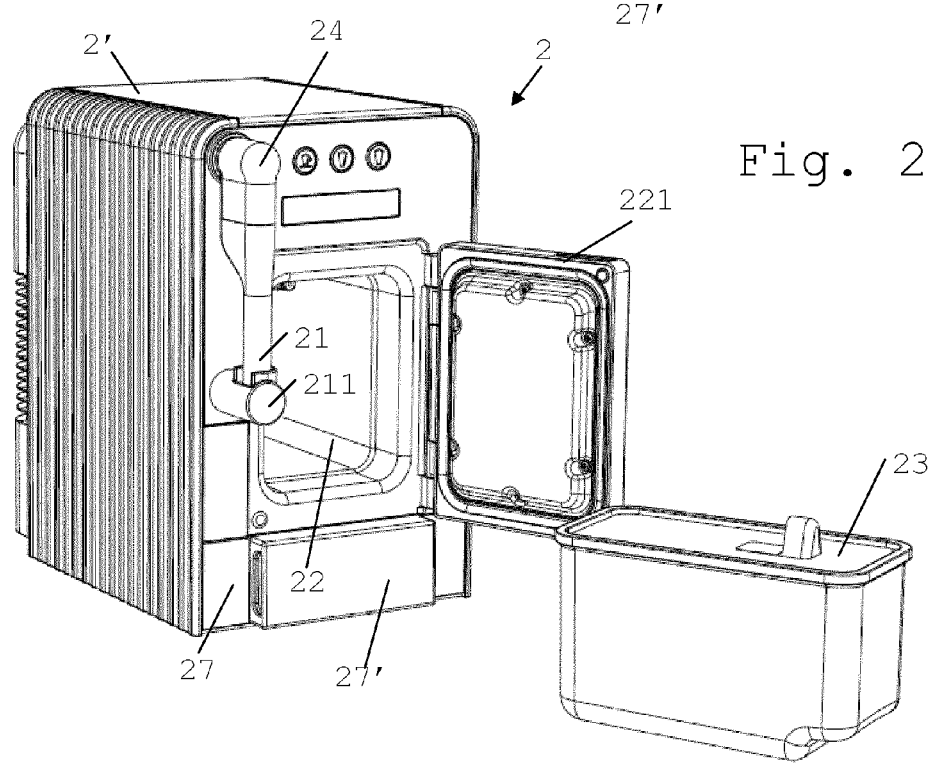
FIG. 2 is a perspective front view of this second beverage machine.

As shown in FIGS. 1, 2 and 4, second machine 2 comprises a milk supply arrangement 22,23, in particular a milk reservoir comprising a cooling cavity 22 containing a removable milk tank 23. Cooling cavity 22 has insulting walls and an insulating door 221 cooperating with one or more cooling elements, typically including a heat evacuation ventilation system 222. Cooling cavity 22 may be maintained at about 5° C.

Furthermore, as schematically illustrated in dotted lines in FIG. 1, second machine 2 may include an arrangement 24,26 for frothing and/or heating milk 25 from milk supply arrangement 22,23. Frothing and/or heating arrangement 24,26 can comprise a steam generator in the form of a boiler 26. A pump 26' is configured for circulating water from a water reservoir 27' into steam generator 26. Steam 25' generated in generator 26 is mixed with milk 25 and optionally with air 25'', in particular within a venturi device 24 in or upstream outlet 21. Frothed and/or heated milk 25''' is dispensed via outlet 21.

Moreover, second machine 2 can have a collector reservoir 27 for collecting a cleaning liquid 25', e.g. hot water and/or steam 25', circulated through the frothing and/or heating arrangement 24,26. The cleaning liquid may be generated by boiler 26 fed with water from reservoir 27' via pump 26'. Collector reservoir 27 and supply reservoir 27' may be adjacent to each other, in particular formed as a single component with two compartments defining reservoirs 27,27', and/or insertable into machine 2 and/or removable therefrom as a drawer, e.g. a bottom drawer of machine 2.

Second outlet 21 can be movable, e.g. pivotable, between: an operative position for dispensing the second beverage 25''' onto the beverage dispensing area 12,12', e.g. the appropriate user-recipient support; and a distant position, such as a rest or service position on a docket station 211. Docket station 211 may have a collar 211' to receive outlet 21 in the distant position. Collar 211' may serve to stop the return movement of outlet 21 and/or confine circulation of liquid from outlet 21 into docket station 211.

As illustrated in FIG. 1, the operative position of outlet 21 is off-set relative to main body 2' of machine 2, in particular on the side of body 2', and located over the dispensing area defined by cup support(s) 12,12' of machine 1. The distant position of outlet 21 is aligned with main body 2', in particular in front of body 2', as shown in FIG. 2. Outlet 21 can be pivotally mounted on main body 2' so as to be movable between the operative position and the distant position.

In particular, second machine 2 can be prevented from dispensing second beverage 25''' when second outlet 21 is in the distant position. Likewise, second machine can be prevented from carrying out a cleaning process when second outlet 21 is away from the distant position, in particular when second outlet 21 is in the operative position. One or more sensors may be provided to detect the position of outlet 21, in particular when outlet 21 is in the distant position and/or in the operative position. Docket station 211 may be in fluid communication, e.g. via an inner duct, with collector reservoir 27 so as to collect cleaning liquid from outlet 21 and evacuate the liquid into reservoir 27.

To avoid any undesired collision with an improperly placed cup or mug 4, second outlet 21 may be movable only manually into the operative position above the cup or mug. A return of outlet 21 into a distant position, e.g. on docket station 211 may be automatic, e.g. via an actuator in the form of an internal spring 212 that is stressed by manually moving second outlet 21 into the operative position and that drives second outlet 21 from the operative position into the distant position by relaxing.

The actuator may be configured to return outlet 21 automatically at an end of a beverage dispensing process of second machine 2. For example, outlet 21 cooperates with a locking device that locks outlet 21 in the dispensing position. The locking device may lock outlet 21 in the dispensing position until beverage dispensing is completed or until return is requested by a user or otherwise needed, e.g. for service purposes, and then the locking device releases outlet 21 to allow the automatic return. In a variation, it is also possible to provide an electric motor as an actuator to move automatically the second outlet between the dispensing position and the distant position. The second outlet may be moved automatically into the dispensing position, a collision sensor being preferably provided, e.g. mechanically or optically, to detected and prevent any collision between a user-recipient and the second outlet when moving to the dispensing position.

As mentioned above, first machine 1 can comprise a first control module 19' for controlling preparation of first beverage 15''' and the second machine may include a second control module 29' for controlling the preparation of second beverage 25'''. First and second control modules 19',29' can be in direct or indirect data-communication when second machine 2 is connected to first machine 1, e.g. via corresponding data-interfaces 18,28. Typically, first and second control modules 19',29' may be in data-communication to coordinate dispensing of first and second beverages 15''',25''' via first and second outlets 11,21. First and second control modules 19',29' may be arranged to coordinate and dispense, in particular successively, first and second beverages 15''',25''' on a single user-request of a combined beverage of first and second beverages 15''',25''', in particular via a single user-actuation of a user-interface 1A,2A of the first or the second machine 1,2. Likewise, first and second control modules 19',29' are arranged to provide information to a user via a user-interface 2B that is integrated in second machine 2. For instance, interface 2B is a screen or touch-screen or another device for providing visual and/or sound signals to a user.

For example, when machines 1,2 are connected via interfaces 18,28, a user will have the option of requesting: a first beverage only, a second beverage only, or a combination of first and second beverages. In each case, only one user-selector 1A,2A will have to be actuated by a user. In particular a combination beverage may be requested via user-selector 2A of second machine 2. A proper coordination of control units 19',29', e.g. one control unit operating as a master and the other control unit operating as a slave, will lead to the coordinated control of machines 1,2 and dispensing of beverages 15''',25''' via outlets 11,21, as desired by a user. It is also possible that, when connected together, only one of user-interfaces 1A,2B remains active.

As illustrated in FIG. 1, machine 2 further includes a feed-back panel 2B, e.g. a screen for providing information on a beverage preparation process and/or the status of machine 2 and/or machine 1, e.g. the temperature or availability of milk in tank 23.

When first and second machines 1,2 are disconnected, first machine 1 can be arranged to prepare and dispense first beverage 15''' and/or second machine 2 can be arranged to prepare second beverage 25'''. Hence, machines 1,2 may be used in combination or separately to prepare a beverage 15''',25'''.

First and second machines 1,2 may have each a power connection 19,29 for separate connection to a power supply, e.g. to the mains. Electric cords may be used to connect each connector 19,29. An arrangement 191 may be provided to guide and/or secure such an electric cord on a face of machine 1, e.g. on a bottom face thereof. Likewise, a similar arrangement 181 may be provided for a data-transmission cable connecting connectors 18,28.

The invention claimed is:

1. A beverage preparation system comprising:
   a first machine configured to prepare and dispense a first beverage via a first outlet onto a beverage dispensing area for positioning a cup or mug; and
   a second machine configured to prepare and dispense a second beverage via a second outlet, the second machine comprising a milk supply arrangement and a frothing and/or heating arrangement configured to froth and/or heat milk from the milk supply arrangement, and the frothing and/or heating arrangement comprising a steam generator configured to mix steam into the milk; and
   a mechanical connecting member comprising plugs fitting corresponding sockets in the first machine and the second machine, the sockets comprising data interfaces which provide a data connection between the first machine and the second machine,
   wherein the first machine and the second machine are both operable in a standalone configuration, the second machine disconnectably connected to the first machine by the mechanical connecting member and separable from the first machine, and
   the first and second machines, when connected, are configurable so that the second outlet is positioned or positionable adjacent to the first outlet to dispense the second beverage onto the beverage dispensing area and into the cup or mug in position for collecting the first beverage from the first outlet, and the first outlet and the second outlet are relatively positionable to be distant by no more than 5 cm.

2. The beverage preparation system of claim 1, wherein the milk supply arrangement comprises a milk reservoir comprising a cooling cavity containing a milk tank.

3. The beverage preparation system of claim 2, wherein the frothing and/or heating arrangement further comprises a venturi device for mixing the steam.

4. The beverage preparation system of claim 3, wherein the second machine further comprises a collector reservoir for collecting a cleaning liquid circulated through the frothing and/or heating arrangement.

5. The beverage preparation system of claim 1, wherein the second outlet is movable between an operative position for dispensing the second beverage onto the beverage dispensing area and a distant position.

6. The beverage preparation system of claim 5, wherein the second outlet is movable manually into the operative position.

7. The beverage preparation system of claim 5, wherein the second outlet is movable automatically into the operative position.

8. The beverage preparation system of claim 5, wherein the second machine comprises an actuator for automatically returning the second outlet from the operative position into the distant position.

9. The beverage preparation system of claim 1, wherein the first and second machines are directly or indirectly rigidly connected by a disconnectable mechanical link.

10. The beverage preparation system of claim 1, wherein the first machine comprises a first control module for controlling the preparation of the first beverage, and wherein the second machine comprises a second control module for controlling the preparation of the second beverage, the first and second control modules being in direct or indirect data-communication when the second machine is connected to the first machine.

11. The beverage preparation system of claim 10, wherein the first and second control modules are in direct or indirect data-communication provided by the mechanical connecting member to coordinate the dispensing of the first and second beverages via the first and second outlets.

12. The beverage preparation system of claim 11, wherein the first and second control modules are arranged to coordinate and dispense the first and second beverages on a single user-request of a combined beverage of the first and second beverages.

13. The beverage preparation system of claim 11, wherein the first and second control modules are arranged to provide information to a user via a user-interface that is integrated either in the first machine or in the second machine.

14. The beverage preparation system of claim 1, wherein at least one of the first and second machines are configured for the beverage preparation and dispensing when the first and second machines are disconnected.

15. A system comprising:
   a first machine; and
   a second machine for preparing a second beverage and for use with the first machine, the second machine comprising
   a milk supply arrangement,
   a frothing and/or heating arrangement configured to froth and/or heat milk from the milk supply arrangement, the frothing and/or heating arrangement comprising a steam generator configured to mix steam into the milk,
   a control module and a second outlet for dispensing the second beverage onto a beverage dispensing area for positioning a user-recipient, and
   a connector disconnectably connectable to the first machine for preparing and delivering a first beverage, the connector comprising a mechanical connecting member that comprises plugs fitting corresponding sockets in the first machine and the second machine, the sockets comprising data interfaces which provide a data connection between the first machine and the second machine, and the first machine and the second machine are both operable in a standalone configuration, the first machine having a first control module and configured to prepare and dispense a first beverage via a first outlet onto the beverage dispensing area, the second control module is arranged to be in data-communication with the first module to coordinate and dispense the first and second beverages on a single user-request of a combined beverage of the first and second beverages, and the first outlet and the second outlet are relatively positionable to be distant by no more than 5 cm.

16. A beverage preparation system comprising:

a first machine for preparing and dispensing a first beverage via a first outlet onto a beverage dispensing area for positioning a cup or mug, the first machine comprising a first control module configured to control the preparation of the first beverage; and a second machine for preparing and dispensing a second beverage via a second outlet, the second machine comprising a second control module configured to control the preparation of the second beverage; and a mechanical connecting member comprising plugs fitting corresponding sockets in the first machine and the second machine, the sockets comprising data interfaces which provide a data connection between the first machine and the second machine, wherein the first machine and the second machine are both operable in a standalone configuration, the second machine disconnectably connected to the first machine by the mechanical connecting member and separable from the first machine, the first and second control modules are in direct or indirect data-communication when the second machine is connected to the first machine, and the first and second machines, when connected, are configurable so that the second outlet is positioned or positionable adjacent to the first outlet to dispense the second beverage onto the beverage dispensing area and into the cup or mug in position for collecting the first beverage from the first outlet, and the first outlet and the second outlet are relatively positionable to be distant by no more than 5 cm.

17. The beverage preparation system of claim 1, wherein the beverage dispensing area is delimited by at least one support connected to the first machine, and the mechanical connecting member connects the first and second machines in a position in which the first outlet is vertically aligned with the beverage dispensing area and the second outlet is positioned or positionable in vertical alignment with the beverage dispensing area.

* * * * *